UNITED STATES PATENT OFFICE.

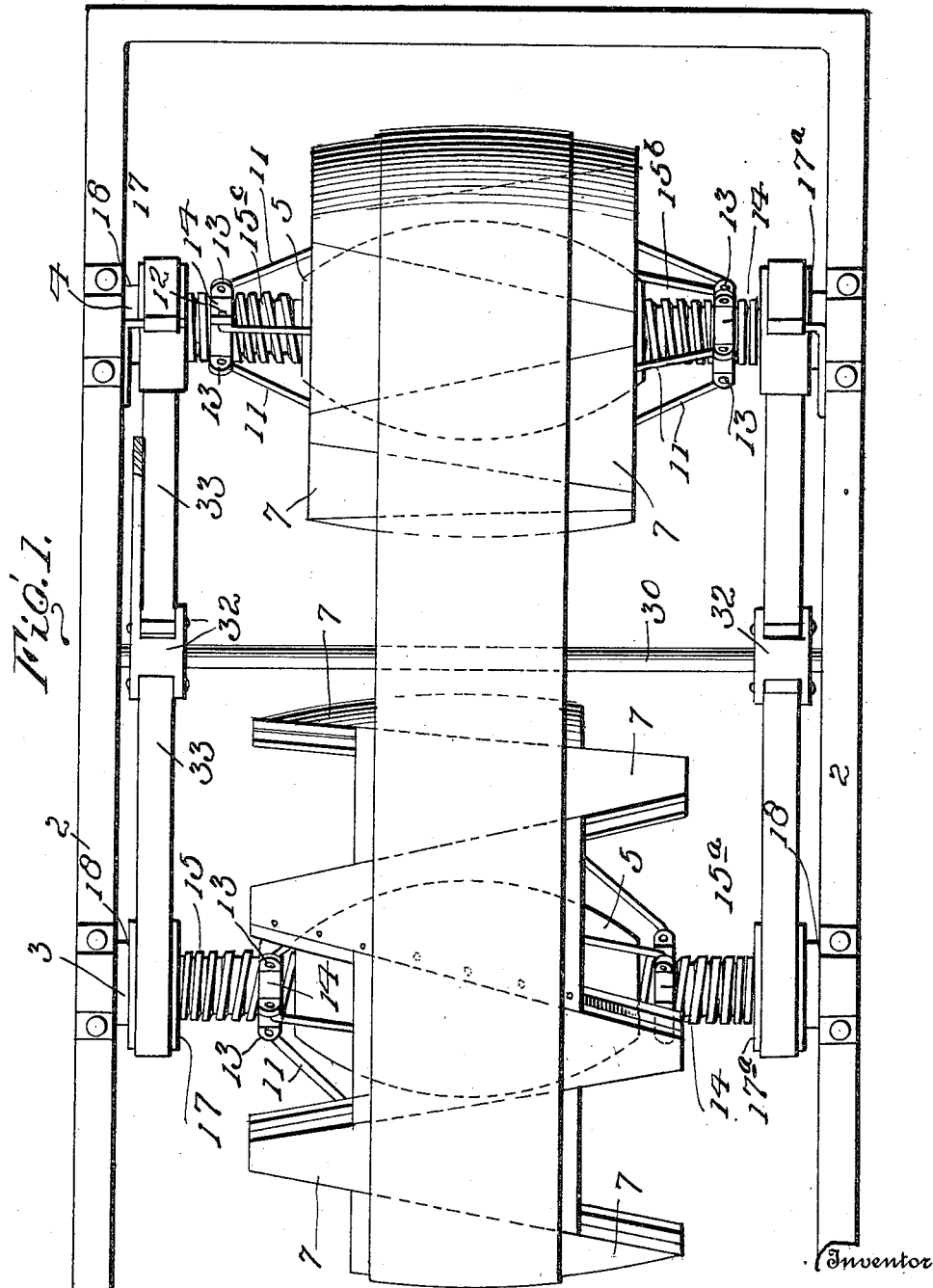

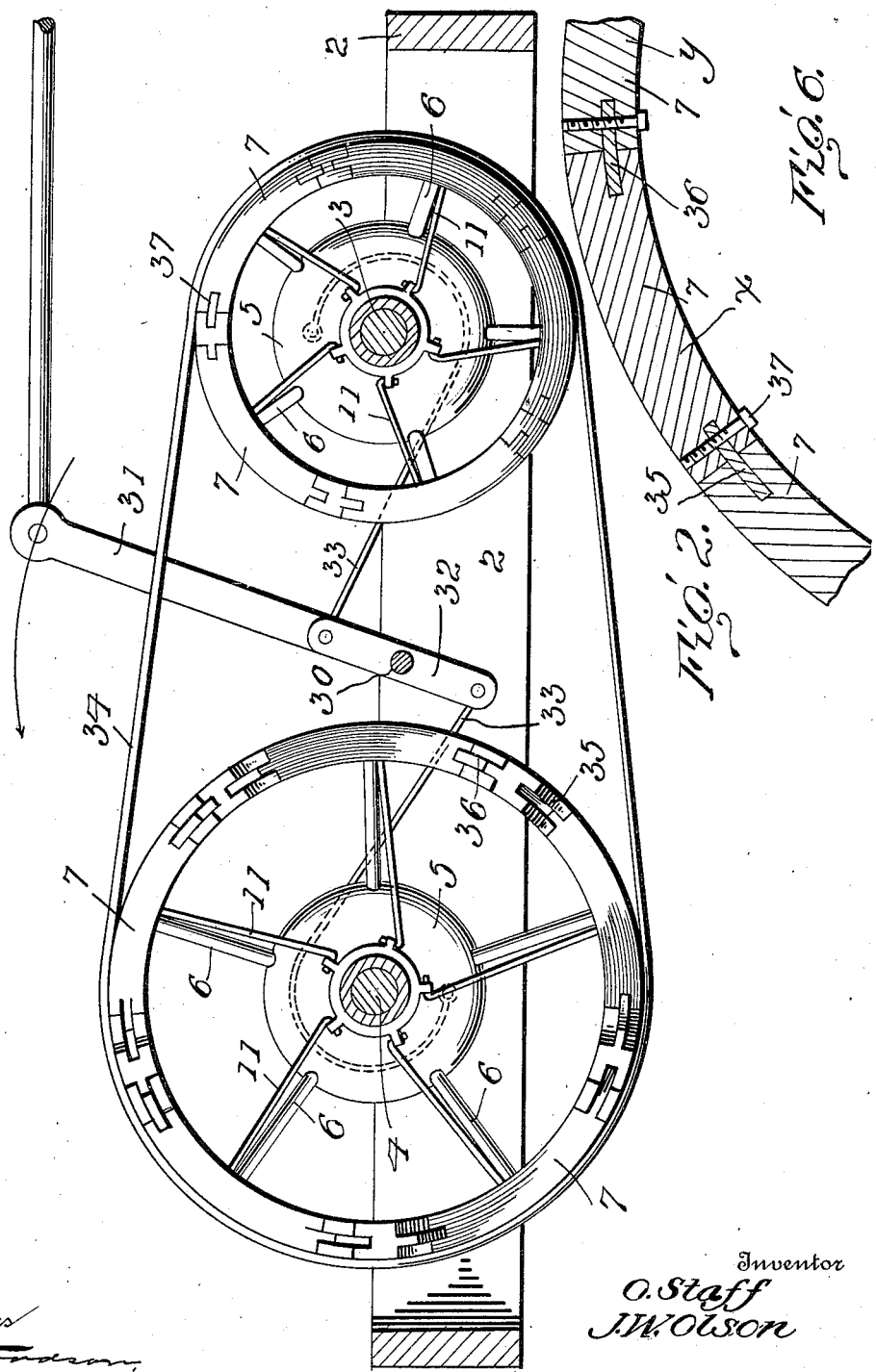

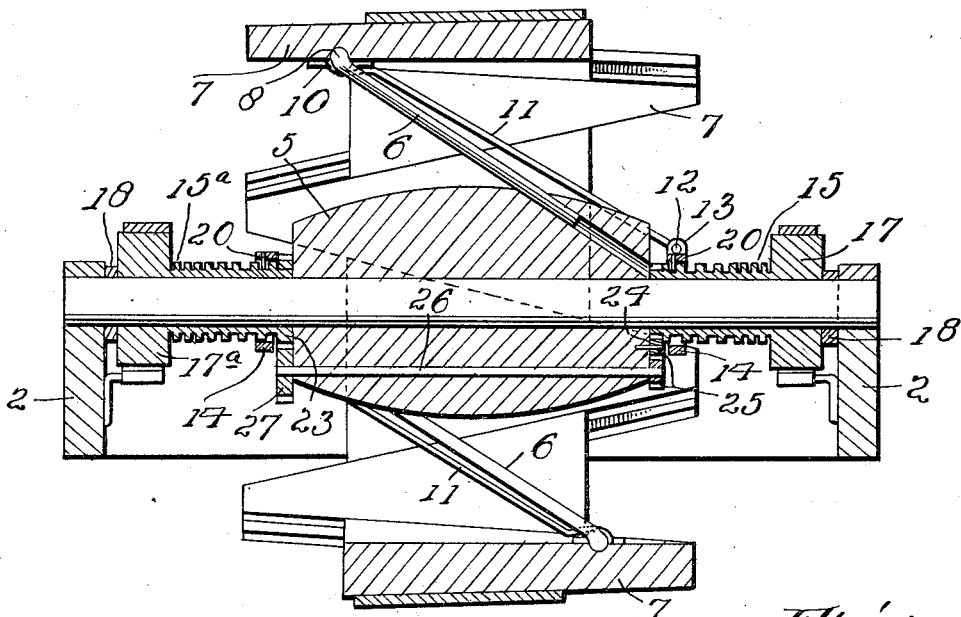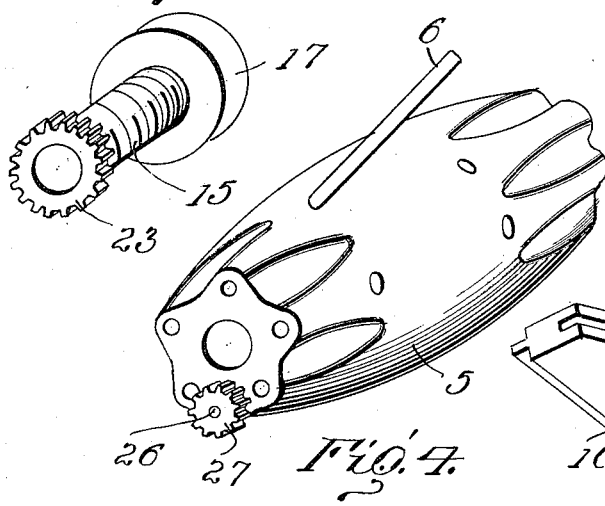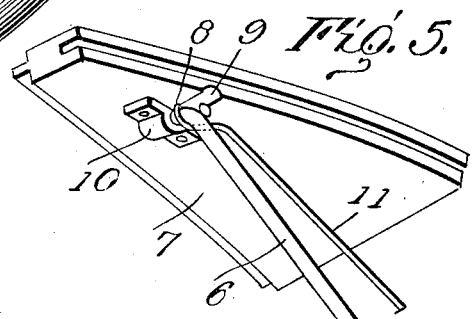

OLOF STAFF AND JOHN W. OLSON, OF LOTHROP, MONTANA.

VARIABLE TRANSMISSION-GEARING.

999,530.  Specification of Letters Patent.  Patented Aug. 1, 1911.

Application filed January 4, 1910. Serial No. 536,397.

*To all whom it may concern:*

Be it known that we, OLOF STAFF and JOHN W. OLSON, citizens of the United States, residing at Lothrop, in the county of Missoula and State of Montana, have invented certain new and useful Improvements in Variable Transmission-Gearing, of which the following is a specification.

This invention relates to improvements in variable speed gearing particularly applicable to pulleys and other rotary elements driven by belt, rope, chain, or other suitable means, and the primary object of the invention is to provide an expansible pulley of a novel construction, wherein the sections of the pulley rim are at all times in engagement with each other and which have a slightly bowed form so that the belt may be held in place upon the pulley.

Another object of the invention is to provide means whereby a pair of expansible pulleys, such as above referred to, may be reversely operated so that one of the pulleys will decrease in size, while the other pulley will increase in diameter.

Still another object is to provide means whereby the pulleys may be expanded or contracted by power obtained from the shafts upon which the pulleys are mounted.

The invention includes, in general terms, a pair of expansible pulleys, each of the pulleys consisting of sliding sections having an approximately triangular shape, the side edges of which sections are in engagement with each other, and sleeves surrounding the shafts upon which the pulleys are mounted and controlling the movement of the pulley sections, the sleeves being screw-threaded and engaging with collars so that when the sleeves are rotated relatively to the shaft upon which they are mounted, the collars will be engaged by the screw threads and be moved to or from the pulley, thus actuating the sections of which the pulley is formed.

For a full understanding of the invention and the merits thereof, and to acquire a knowledge of the details of construction, reference is to be had to the following description and accompanying drawings, in which:

Figure 1 is a plan view of our variable speed device. Fig. 2 is a side elevation thereof. Fig. 3 is a detailed longitudinal section of one of the expansible pulleys. Fig. 4 is a detailed perspective view of the hub of one of the said pulleys; Fig. 5 is a detailed perspective view showing the under side of one of the rim sections, and, Fig. 6 is an enlarged fragmentary detail section of the pulley rim.

Corresponding and like parts are referred to in the following description and indicated in all the views of the drawings by the same reference characters.

Referring to the figures, 2 designates any suitable supporting frame upon which are mounted the parallel shafts 3 and 4. Carried rigidly upon each of the shafts 3 and 4, at the middle thereof, is the hub 5, this hub having the peculiar form shown in Fig. 4, whereby a plurality of bearings are provided for the sliding resilient spokes 6. The spokes 6 alternately project in opposite directions toward the middle of the hub and extend outwardly from the middle of the hub, and support on their outer ends the triangular rim sections 7. These rim sections are triangular in plan and slightly curved from the broad end of the triangle toward the apex thereof. The sections have tongue and grooved engagement with each other, as will be later explained, so that the sections may have a sliding engagement with each other along their whole extent. It will be seen that when the ends of the sections coincide, the rim will have a minimum diameter, and that when the sections are moved in directions opposite to each other, in the direction in which they taper, the pulley will gradually be increased in diameter, the sections, however, remaining in engagement with each other along an extended portion of their side edges. It will also be seen from Fig. 1 that the pulley will have a convexly rounded face, so that the belt will be held in position upon the middle of the pulley.

The spokes 6 are formed of resilient material so as to permit the outer ends of the spokes to yield as the rim sections move outwardly. As a means of attaching the spokes 6 to the sections, we form the ends of the spokes with angular bends 8 which are received in recesses 9 on the inner face of the rim sections and are held in place by plates 10 attached to the inner faces of the rims in any suitable manner. Any other means of engaging the extremities of the spokes to the rim sections may be used, however.

In order to shift the rim sections, we attach to each section the pivoted arm 11. This arm, at its inner extremity, is pivotally supported on the inner face of a rim section, while its outer extremity is angularly bent, as at 12, for engagement with an eye 13 formed in the adjacent actuating collar 14 which is mounted as will be hereafter described. Loosely mounted upon the ends of one of the shafts 3 are the sleeves 15, 15ª, and upon the ends of the other shaft 4 are the sleeves 15ᵇ and 15ᶜ. The outer extremities of the sleeves are formed with brake disks 17 17ª, and in order to hold the sleeves in their proper position upon the shaft 3, we provide the loose washers 18 which are interposed between the disks 17 17ª and the bearing of the shaft. The exterior face of each sleeve is screw-threaded. The screw threads on the sleeve 15 run in the same direction as the screw threads on the sleeve 15ª, these being the sleeves mounted upon the shaft 3. The sleeves 15ᵇ and 15ᶜ, however, of the shaft 4, have screw threads running in a reverse direction to the screw threads on the sleeves 15 and 15ª. Surrounding each of the sleeves 15, 15ª, 15ᵇ and 15ᶜ is an actuating collar 14 which is provided with a pin 20 which pin projects through the collar and engages the screw threads of the sleeve on which the collar is mounted. Thus, if the sleeve is rotated relatively to the collar, the collar will move in one direction or the other longitudinally along the sleeve. Each collar is provided with a plurality of eyes 13 disposed around its circumference, corresponding to the number of rim sections which are to be actuated by that collar. Every other rim section is connected to the collar on one end of the hub and the alternate rim sections to the collar on the opposite end of the hub by means of the arms 11 before described. It will be seen that as the collars 14 are shifted upon the sleeves, the rim sections will also be moved to expand or contract the diameter of the pulley, as before described.

In order to secure a proper movement of the rim sections in accordance with our invention, it is necessary that the opposed sleeves (as 15 15ª) shall rotate in opposite directions relatively to each other, and to that end we form the inner extremities of the sleeves with teeth 23. The teeth on one of the collars engage with a pinion 24 mounted in the end of the hub 5, and this pin in turn engages with a pinion 25 mounted upon a shaft 26 which extends longitudinally through the hub 5 and carries at its extremity the toothed gear 27 which engages with the teeth 23 on the opposed sleeve. It will thus be seen that when one of the sleeves is rotated in one direction, the opposite sleeve will be rotated in the opposite direction, and thus both collars will move together toward or from the hub. The screw threads on the sleeves decrease in pitch as they near the brake disks 17 so as to increase the speed with which the rim sections are shifted after the initial movement of the rim sections is secured.

Midway between the two pulleys is mounted the transverse rock shaft 30 having on one end the handle 31. The rock shaft at each end being provided with the laterally projecting heads 32 to the opposite ends of which are connected the brake bands 33. These brake bands are so connected to the rock shaft and the heads thereof that when the rock shaft is turned in one direction the brakes will be applied to the brake disks of both shafts on the same side of the machine, while the brake band will be loosened from both disks on the opposite side of the machine. Upon a reversal of the lever, the movement of the brake bands will be reversed, and the sleeves on the other side of the machine will be released, while the sleeves on the first named side will be held in position by the brake bands. Any other arrangement may be used, however, for reversely applying a braking power to the two pairs of sleeves.

The operation of our invention is as follows, it being understood that the description of this operation as applied to one pulley is equally applicable to the other. It will be seen that when a brake is applied to one of the sleeves, through its brake disk, the other sleeve is left unbraked. Under normal circumstances, when it is desired to either expand or contract the pulley, the sleeves being both unbraked, will rotate freely with the shaft, and the collars 19 thereon will hence be stationary. When it is desired to expand the pulley, the brake is applied to one of the disks. This holds the corresponding sleeve, as for instance, the sleeve 15ª, from rotation. The opposite sleeve, as the sleeve 15, however, will rotate with the shaft. The sleeve 15ª being held from rotation, and the shaft 26 being carried around the shaft 3, the pinion 27 will be rotated, rotating the shaft 26, the pinion 25, the pinion 24, and the sleeve 15. Because of the use of the intermediate pinion 24, it will be obvious that the sleeve 15 will rotate reversely to the sleeve 15ª. The collars being rotated by reason of the connection to the rim sections of the pulley, will both move together toward or from the hub. As a consequence, one half the rim sections will be moved in one direction, while the other half of the rim sections will be moved in the opposite direction, thus causing the pulley to expand or contract, depending entirely upon which of the sleeves is held fixed. As before stated, both pulleys operate in precisely the same manner, but because of the reversal of the screw threads on the sleeves 15 and 15ª from the screw threads on the sleeves 15ᵇ and 15ᶜ, one pulley will be expanded while the other is contracted. Which of these pulleys is expanded and which contracted, depends upon the direction in which the actuating lever 31 is moved. A belt 34 passes over the two pulleys so that one is driven from the other. It will be seen that our construction provides for an actuation of the rim sections not through manual power directly applied, but through the power of the respective shafts upon which the pulleys are mounted, this power being transmitted to the sleeves, and these sleeves acting by their screw threads upon the actuating collars.

In order that the rim sections may be taken apart for repair or for other purposes, we preferably form the sections as shown in Fig. 6, that is, all but two of the sections are formed upon one edge with a groove. Two of the rim sections, however, are grooved on both edges, and located within these grooves are the movable strips 35 and 36. The strip 35 is attached to the rim section X by means of the screw 37, or in any other suitable manner, while the other strip 36 is attached to the rim section Y by a screw. By removing these two strips, the rim sections can be taken out and so the pulley be taken entirely apart.

Our invention is simple, effective in practice, and is applicable wherever a variable drive is required. While we have shown what we believe to be the best embodiment of the invention, we do not wish to be limited to the details of the parts or their exact arrangement, as it is obvious that various changes might be made without departing from the spirit of the invention.

One of the advantages incident to the invention, aside from the manner in which the rim sections are operated, lies in the fact that the rim sections of a pulley formed as above described are always in contact with each other, and that there are no spaces between the rim sections, and that thus the belt will have a continuous engagement with the pulley around its entire face, thus decreasing the wear and tear on the pulley.

Having thus described the invention, what is claimed as new is:—

1. The combination with a shaft, of an expansible pulley comprising a laterally shiftable series of rim sections, a hub on the shaft, spokes on the rim sections extending through and longitudinally movable in the hub, and means coöperatively engaged with the rim sections, whereby the sections may be laterally shifted relatively to each other.

2. The combination with a shaft and a hub thereon, of an expansible pulley comprising a series of rim sections, each of said rim sections being triangular in plan, the apices of the rim sections alternating with each other, and each alternating rim section being movable in a like direction, spokes on the bases of each of the rim sections, inclined downward and inward toward the hub and passing through the hub, and means whereby said rim sections may be shifted in opposite directions.

3. The combination with a shaft and a hub thereon, of an expansible pulley comprising a laterally shifting series of rim sections, each of said sections being longitudinally curved, and each being triangular in plan, the apex of one rim section alternating with the base of the next adjacent sections, and said sections being respectively movable in opposite directions, an inwardly and centrally inclined spoke engaging with the base of each of the rim sections and extending through and longitudinally movable in the hub, and means for shifting the rim sections in opposite directions.

4. The combination with a shaft and a hub thereon, of an expansible pulley comprising a laterally shifting series of rim sections, each of said rim sections being longitudinally and laterally curved and being triangular in plan, the apex of one rim section alternating with the bases of the next adjacent rim sections, inwardly and centrally disposed spokes attached one to each of the rim sections and extending through and longitudinally movable in said hub, rods pivotally connected one to each of the rim sections, and means engaging with the rods, whereby the rim sections may be shifted.

5. The combination with an expansible pulley comprising a hub, a series of rim sections carried by the hub and movable in one or the other direction to expand or contract the pulley, and a shaft to which the pulley is fixed, of independent rotatable screw-threaded members on the shaft, mechanism for coöperatively engaging said members for rotation, one relative to the other, laterally shiftable members engaging with the screw-threaded members and connected to said rim sections, and means for holding one of said screw-threaded members from rotation to move said shiftable members in one or the other direction.

6. The combination with an expansible pulley comprising a hub, a series of rim sections carried by the hub, alternate rim sections being movable in opposite directions to the other rim sections to expand or contract the pulley, and a shaft to which the hub is fixed, of independently rotatable screw-threaded members, mechanism for coöperatively engaging said members for rotation, one relative to the other, laterally shiftable members on the screw-threaded members, one of said laterally shiftable members being connected to one set of rim sections and the other to the alternate rim sections, and means for holding one of said screw-threaded members from rotation.

7. The combination with an expansible pulley comprising a hub, a series of rim sections carried by the hub, and a shaft to which the hub is fixed, of independently rotatable screw-threaded sleeves on the shaft, mechanism for coöperatively engaging said sleeves for rotation, one relative to the other, laterally shiftable collars on the sleeves, engaging with said screw threads, one of said collars being connected to every alternate rim section and the other to the remaining rim sections, and means for holding one of said sleeves from rotation, thereby rotating the other of said sleeves to shift said collars.

8. The combination with an expansible pulley comprising a hub, a series of rim sections carried by the hub and laterally shiftable in one or the other direction to expand or contract the pulley, and a shaft to which the hub is fixed, of independently rotatable exteriorly screw-threaded sleeves surrounding the shaft on each side of the pulley, a longitudinally extending shaft passing through the hub and having meshing engagement with said sleeves, loose collars surrounding the sleeves and engaging with said screw threads thereon, connecting rods pivoted to the collars and each pivoted to alternate rim sections, and means for holding one of said sleeves from rotation, when desired.

9. The combination with an expansible pulley comprising a hub, a series of rim sections carried by the hub and movable in one direction or the other to expand or contract the pulley, and a shaft to which the hub is fixed, of independently rotatable exteriorly screw-threaded sleeves mounted on the shaft on each side of the pulley, said sleeves having screw threads extending in the same direction, a shaft passing through the hub, having pinions at its ends, the pinion on one end of the shaft rotatably engaging directly with the end of one of the sleeves, an intermediate pinion with which the other shaft pinion engages, said intermediate pinion meshing with the other sleeve, a collar surrounding each of the sleeves and engaging with said screw threads, pivoted sections between the collars and the alternate rim sections, and means for holding either one of said sleeves from rotation.

10. The combination with an expansible pulley comprising a hub, a series of laterally shiftable rim sections, a shaft to which the hub is fixed, and spokes attached to said rim sections and projecting into and movable through said hub and the shaft to which the hub is fixed, of independently rotatable screw-threaded sleeves on opposite ends of the shaft, the inner ends of said sleeves being provided with teeth, a shaft passing through the hub and provided with pinions at its ends, the pinion at one end engaging with the teeth on the adjacent sleeve, an intermediate pinion mounted on the hub and engaging with the pinion on the other end of the shaft, said intermediate pinion engaging with the teeth of the adjacent sleeve, a collar on each of the sleeves and engaging with the screw threads thereof, a rod pivoted to each collar and to one of the rim sections, and means for holding either one of said sleeves from rotation.

11. The combination with parallel shafts, a hub on each shaft, spokes longitudinally movable in each hub, and a series of rim sections carried by said spokes and forming an expansible pulley on each shaft, of independently rotatable screw-threaded sleeves on the opposite ends of each shaft, the sleeves on one shaft being threaded in the same direction, but in an opposite direction to the sleeves on the other shaft, a shaft passing longitudinally through each hub, each shaft having at one end a pinion engaging with the adjacent sleeve, an intermediate pinion mounted in said hub and engaging with the other end of said shaft and with the adjacent sleeve, laterally shiftable collars, one on each of the sleeves and having an inwardly projecting pin engaging with the screw threads of that sleeve, rods connecting said collars to alternate rim sections of each pulley, friction disks fast on each sleeve, and opposed brakes simultaneously engaging with the friction disks on like ends of both shafts and disengaging with the friction disks on opposite ends of both shafts.

In testimony whereof we affix our signatures in presence of two witnesses.

OLOF STAFF. [L. S.]
JOHN W. OLSON. [L. S.]

Witnesses:
  A. J. PALMER,
  J. A. McCANN.

---

Copies of this patent may be obtained for five cents each, by addressing the "Commissioner of Patents. Washington, D. C."